(12) United States Patent
Awano (10) Patent No.: US 10,611,427 B2
(45) Date of Patent: Apr. 7, 2020

(54) FRONT FORK (71) Applicant: KYB CORPORATION, Tokyo (JP)

(72) Inventor: Koichiro Awano, Tokyo (JP)

(73) Assignee: KYB CORPORATION, Tokyo (JP)

( * ) Notice: Subject to any disclaimer, the term of this patent is extended or adjusted under 35 U.S.C. 154(b) by 132 days.

(21) Appl. No.: 15/780,939

(22) PCT Filed: Dec. 8, 2016

(86) PCT No.: PCT/JP2016/086483
§ 371 (c)(1),
(2) Date: Jun. 1, 2018

(87) PCT Pub. No.: WO2017/119230
PCT Pub. Date: Jul. 13, 2017

(65) Prior Publication Data
US 2018/0281893 A1    Oct. 4, 2018

(30) Foreign Application Priority Data

Jan. 5, 2016 (JP) ................................. 2016-000496

(51) Int. Cl.
*B62K 25/08* (2006.01)
*F16F 9/46* (2006.01)
(Continued)

(52) U.S. Cl.
CPC ............... *B62K 25/08* (2013.01); *F16F 9/19* (2013.01); *F16F 9/34* (2013.01); *F16F 9/464* (2013.01);
(Continued)

(58) Field of Classification Search
CPC ............... B62K 25/08; B62K 2025/044; F16F 2228/066; F16F 9/065; F16F 9/19;
(Continued)

(56) References Cited

U.S. PATENT DOCUMENTS 5,211,420 A * 5/1993 Iwashita ............... B60G 15/063
180/219
7,520,372 B2 * 4/2009 Fox ........................ B62K 25/04
188/275
(Continued)

FOREIGN PATENT DOCUMENTS

| JP | 2011-0529822 A | 12/2011 |
| JP | 2014208510 A * | 11/2014 |
| JP | 2017015191 A * | 1/2017 |

*Primary Examiner* — Laura Freedman
(74) *Attorney, Agent, or Firm* — Paratus Law Group, PLLC (57) ABSTRACT

A front fork of the present invention has: a cylinder in which a damper of one fork leg is connected to an outer tube on a vehicle body side; a piston rod connected to an inner tube on an axle side; and a piston valve attached to the piston rod and movably inserted into the cylinder. A variable throttle for extension-side damping force adjustment is provided in the piston rod. A stroke sensor has a detected element attached to the cylinder, and a detection unit that is attached to the piston rod and detects a displacement of the detected element. A variable throttle for compression-side damping force adjustment is attached to an outer tube on the vehicle body side of another fork leg.

4 Claims, 3 Drawing Sheets (51) Int. Cl.
*F16F 9/34* (2006.01)
*F16F 9/19* (2006.01)
*B62K 25/04* (2006.01)
*F16F 9/06* (2006.01)
*F16F 9/32* (2006.01)
*F16F 9/50* (2006.01)

(52) U.S. Cl.
CPC ......... *B62K 2025/044* (2013.01); *F16F 9/065* (2013.01); *F16F 9/3292* (2013.01); *F16F 9/50* (2013.01); *F16F 2228/066* (2013.01); *F16F 2230/08* (2013.01); *F16F 2230/18* (2013.01)

(58) Field of Classification Search
CPC .. F16F 9/3292; F16F 9/34; F16F 9/464; F16F 9/50; F16F 2230/08; F16F 2230/18
See application file for complete search history.

(56) References Cited

U.S. PATENT DOCUMENTS

| | | | | |
|---|---|---|---|---|
| 8,167,328 B2* | 5/2012 | Powell | ................ | B62K 25/08 280/279 |
| 8,251,376 B2* | 8/2012 | Mouri | ................ | B62K 25/08 188/288 |
| 8,317,171 B2* | 11/2012 | Inoue | ................ | B62K 25/08 188/299.1 |
| 8,905,409 B2* | 12/2014 | Murakami | ......... | B60G 17/0152 280/276 |
| 9,126,651 B2* | 9/2015 | Shirai | ................ | B62K 25/08 |
| 9,481,425 B2* | 11/2016 | Shirai | ................ | B62K 25/08 |
| 9,663,182 B2* | 5/2017 | Mochizuki | ............ | B62K 25/08 |
| 2011/0153158 A1 | 6/2011 | Acocella | | |
| 2017/0015384 A1* | 1/2017 | Kurita | ................ | B62K 25/08 |
| 2017/0240242 A1* | 8/2017 | Kurita | ................ | B62K 25/08 |
| 2018/0154729 A1* | 6/2018 | Awano | ................ | B62K 25/04 |
| 2019/0072149 A1* | 3/2019 | Awano | ................ | F16F 9/50 |

* cited by examiner

FRONT FORK

CROSS REFERENCE TO PRIOR APPLICATION

This application is a National Stage Patent Application of PCT International Patent Application No. PCT/JP2016/086483 (filed on Dec. 8, 2016) under 35 U.S.C. § 371, which claims priority to Japanese Patent Application No. 2016-000496 (filed on Jan. 5, 2016), which are all hereby incorporated by reference in their entirety.

TECHNICAL FIELD

The present invention relates to a front fork.

BACKGROUND ART

Conventionally, some saddle riding type vehicles such as motorcycles have a front fork with semiactive suspension as disclosed in JP 2011-529822 A to improve ride comfort of the vehicle. Such a front fork includes a damper that exerts a damping force, a solenoid valve that makes the damping force of the damper variable, and various sensors that detect vibration information of a vehicle body. In order to cause the above damper to generate an optimum damping force for suppressing vibration of the vehicle, an electronic control device called an electronic control unit (ECU) obtains an optimum damping force from information detected by a sensor such as a stroke sensor, and sends a control command to a driver driving the solenoid valve so that the damper exerts the optimum damping force.

SUMMARY OF THE INVENTION

Here, an unsprung vibration environment in a vehicle is severe as compared with a sprung vibration environment. Therefore, when a detection unit of a sensor such as a stroke sensor provided in an unsprung portion, a correct measurement result may not be obtained due to strong vibrations. Further, when a solenoid valve is provided in the unsprung portion, accurate driving may not be possible. Therefore, when either the detection unit of the stroke sensor or the solenoid valve is disposed in the unsprung portion, a desired damping force may not be obtained.

It is therefore an object of the present invention to provide a front fork in which a solenoid valve that makes a damping force variable and a detection unit of a stroke sensor all can be arranged in a sprung portion.

In the present invention for solving the above problems, a damper of one fork leg has: a cylinder connected to an axle side tube; a piston rod connected to a vehicle body side tube; and a piston valve attached to the piston rod and movably inserted into the cylinder. Further, a solenoid valve for extension-side damping force adjustment is provided in the piston rod of the one fork leg. In addition, a solenoid valve for compression-side damping force adjustment is attached to a vehicle body side tube of another fork leg. Furthermore, a stroke sensor is attached to the one fork leg, and has a detected element attached to the cylinder, and a detection unit that is attached to the piston rod and detects a displacement of the detected element.

DESCRIPTION OF EMBODIMENTS

Embodiments of the present invention will be described below with reference to the drawings. The same reference numerals assigned throughout the several views indicate the same or corresponding parts.

Figure 1:
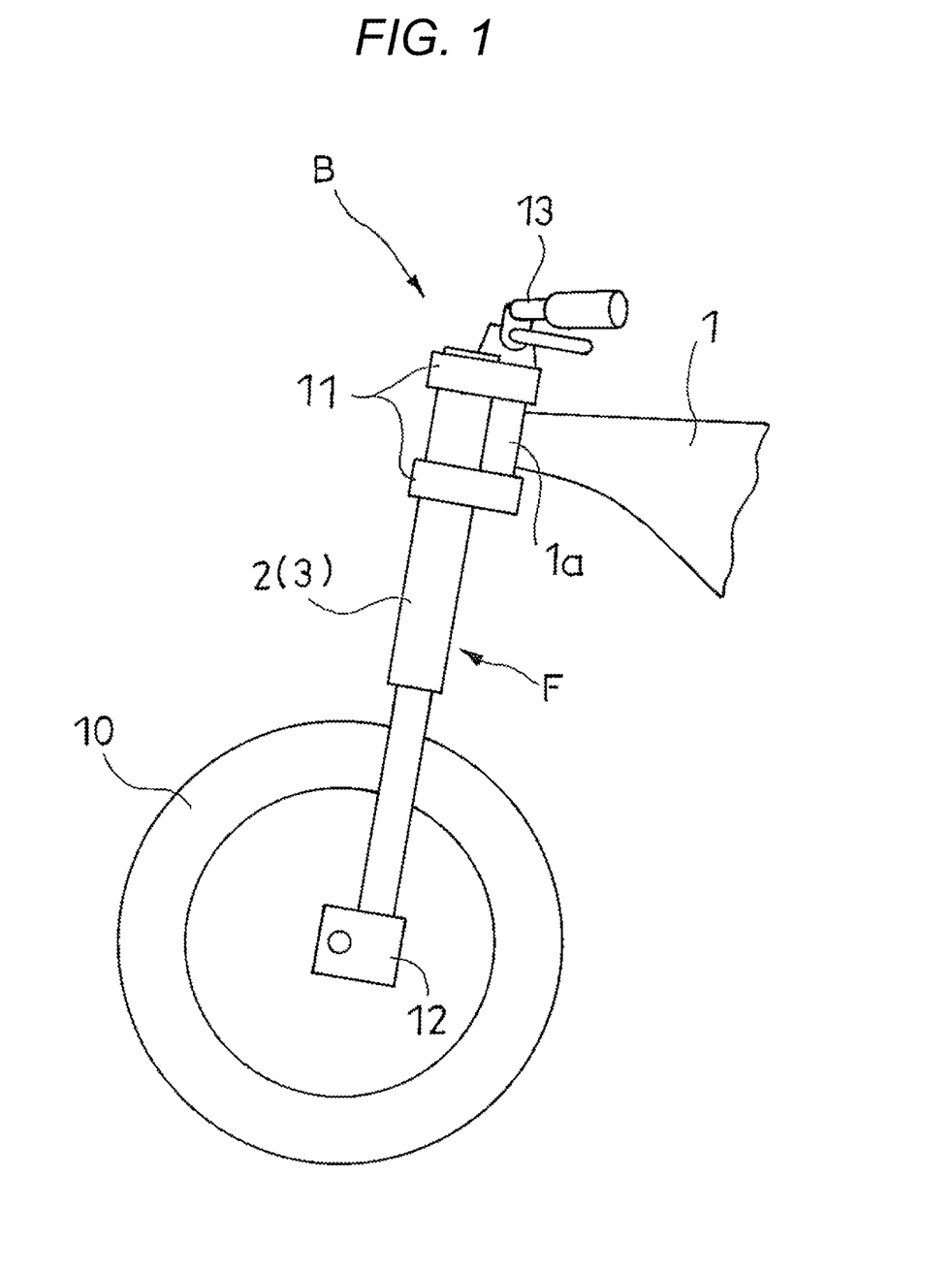
FIG. 1 is a simplified side view showing a part of a vehicle mounted with a front fork according to one embodiment of the present invention.

As shown in FIG. 1, a front fork F according to one embodiment of the present invention is interposed between a vehicle body 1 and a front wheel 10, of a motorcycle B. Then, the front fork F includes: a pair of fork legs 2 and 3 standing on both sides of the front wheel 10; a vehicle body side bracket 11 connecting these fork legs 2 and 3 to the vehicle body 1; and an axle side bracket 12 connecting each of the fork legs 2 and 3 to an axle of the front wheel 10. The front fork F supports the axle of the front wheel 10 from both sides in an axial direction with the pair of fork legs 2 and 3. Further, a handlebar 13 and a steering shaft (not shown) are attached to the vehicle body side bracket 11, and the steering shaft is rotatably inserted into a head pipe 1a of a vehicle body frame serving as a skeleton of the vehicle body 1, and axially supported by a bearing (not shown). Therefore, operation of the handlebar 13 rotates the front fork F around an axis of the steering shaft, enabling change of a direction of the front wheel 10.

Figure 2:
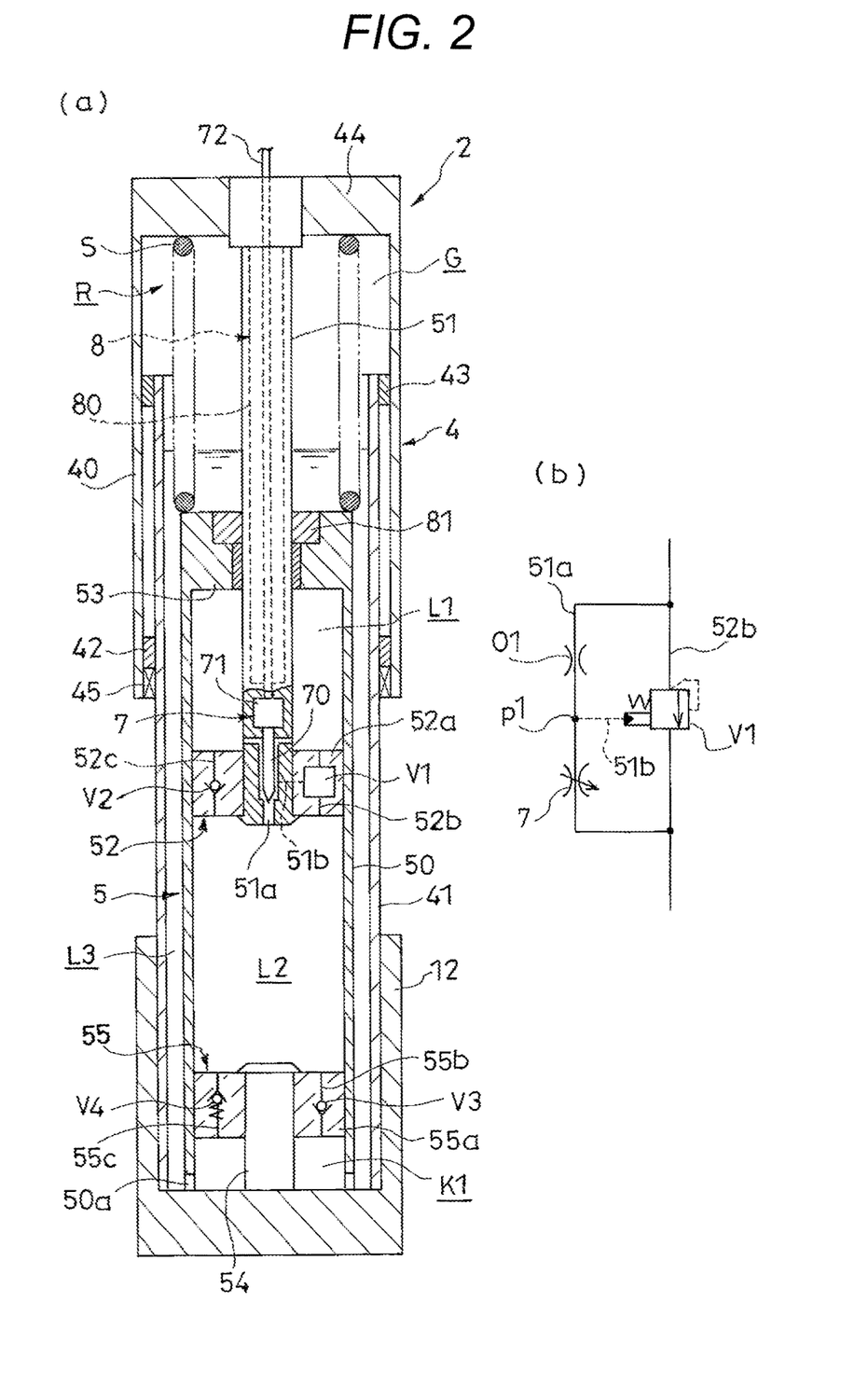
FIG. 2(a) is a schematic cross-sectional view showing one fork leg of a front fork according to one embodiment of the present invention.
FIG. 2(b) is a circuit diagram of a piston valve portion of FIG. 2(a).

As shown in FIGS. 2(a) and 3(a), the pair of fork legs 2 and 3 both have: a telescopic tube member 4 having an outer tube 40 and an inner tube 41 inserted into the outer tube 40; and dampers 5 and 6 and a suspension spring S that are provided in the tube member 4 and interposed between the outer tube 40 and the inner tube 41. Each the tube member 4 is an inverted type, the outer tube 40 is provided on the vehicle body side and connected to the vehicle body side bracket 11 (FIG. 1), and the inner tube 41 is provided on the axle side and connected to the axle side bracket 12. Then, when an impact caused by road surface irregularity is input to the front wheel 10, the inner tube 41 moves in and out of the outer tube 40 to cause extension and contraction of the tube member 4, the dampers 5 and 6, and the suspension spring S, resulting in an extension/contraction operation of the front fork F.

Figure 3:
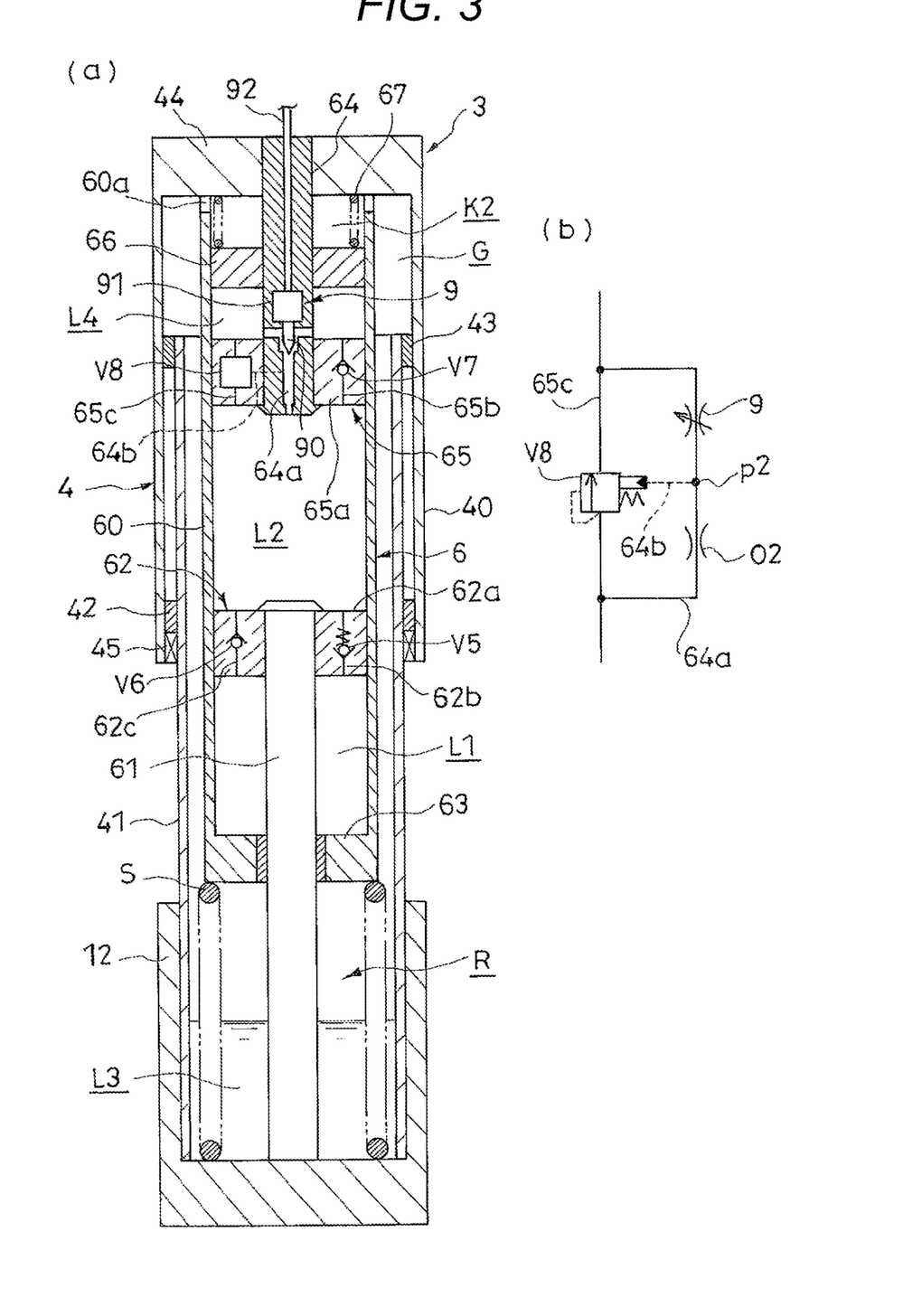
FIG. 3(a) is a schematic cross-sectional view showing another fork leg of a front fork according to one embodiment of the present invention.
FIG. 3(b) is a circuit diagram of a base valve portion of FIG. 3(a).

Further, the tube member 4 of each of the fork legs 2 and 3 includes: the outer tube 40 and the inner tube 41 described above; a bushing 42 held on a lower inner periphery of the outer tube 40 in FIGS. 2(a) and 3 (a) and slidably in contact with an outer periphery of the inner tube 41; and a bushing 43 held on an upper end outer periphery of the inner tube 41 in FIGS. 2(a) and 3(a) and slidably in contact with an inner periphery of the outer tube 40. That is, since the inner tube 41 slides in the outer tube 40 while being axially supported by the bushings 42 and 43, both of the fork legs 2 and 3 can smoothly expand and contract.

Then, an upper end opening of the outer tube 40 in FIGS. 2(a) and 3(a), which is an upper end of each the tube member 4 in FIGS. 2(a) and 3(a), is closed with a cap 44. Further, a lower opening of the inner tube 41 in FIGS. 2(a) and 3(a), which is a lower end of each the tube member 4 in FIGS. 2(a) and 3(a), is closed with the axle side bracket 12. Furthermore, in each the tube member 4, a lower opening in FIGS. 2(a) and 3(a) of an overlapping portion where the outer tube 40 and the inner tube 41 overlap with each other is closed by an annular seal member 45 that is held on a lower end inner periphery of the outer tube 40 in FIGS. 2(a) and 3(a), and is slidably in contact with the outer periphery of the inner tube 41. Therefore, the inside of each the tube member 4 becomes a sealed space and is partitioned from outside air.

The damper 5 of the one fork leg 2 shown in FIG. 2(a) is an upright type, and has: a cylinder 50 connected to the inner tube 41 on the axle side via the axle side bracket 12; a piston rod 51 having a terminal end connected to the outer tube 40 on the vehicle body 1 side via the cap 44, and a distal end movably inserted into the cylinder 50; a piston valve 52 attached to a distal end part of this piston rod 51 and slidably inserted into the cylinder 50; an annular rod guide 53 fixed to an opening on one side of the cylinder 50 and axially supporting the piston rod 51 slidably; a base rod 54 having a terminal end connected to the inner tube 41 via the axle side bracket 12, and a distal end side inserted into an opposite side to the piston rod in the cylinder 50; and a base valve 55 attached to a distal end part of this base rod 54 and fixed at a predetermined position inside the cylinder 50.

Further, the suspension spring S of the one fork leg 2 is a coil spring, and is interposed between the cap 44 and the rod guide 53. That is, one end of the suspension spring S is supported by the outer tube 40 via the cap 44, and the other end of the suspension spring S is supported by the inner tube 41 via the rod guide 53, a cylinder 50, and the axle side bracket 12. Meanwhile, the suspension spring S may be a spring other than a coil spring, such as an air spring, for example. When the suspension spring S is an air spring, the weight of the front fork F can be reduced.

Further, in the cylinder 50, there are formed an extension-side chamber L1 and a compression-side chamber L2 that are vertically partitioned by the piston valve 52 in FIG. 2(a). Then, the extension-side chamber L1 and the compression-side chamber L2 are filled with liquid such as hydraulic oil. In addition, a reservoir R is formed between an outside of the cylinder 50 and the tube member 4. This reservoir R is configured to have a liquid storage chamber L3 that stores liquid, and an air chamber G formed above a liquid surface of the liquid storage chamber L3 to be sealed with gas. A hole 50a is formed in the cylinder 50 below the base valve 55 in FIG. 2(a), and the liquid can freely move in and out of the cylinder 50 via this hole 50a. That is, a space K1 formed below the base valve 55 in the cylinder 50 in FIG. 2(a) communicates with the outside of the cylinder 50 via the hole 50a, and the liquid storage chamber L3 extends to this space K1. Then, this liquid storage chamber L3 is partitioned from the compression-side chamber L2 by the base valve 55.

Next, the piston valve 52 has: a valve disc 52a that partitions the extension-side chamber L1 and the compression-side chamber L2; an extension-side passage 52b and a compression-side passage 52c that are formed in this valve disc 52a to communicate the extension-side chamber L1 with the compression-side chamber L2; an extension-side valve V1 provided in the extension-side passage 52b to open and close this extension-side passage 52b; and a compression-side valve V2 provided in the compression-side passage 52c to open and close this compression-side passage 52c. The extension-side valve V1 is an extension-side damping valve, which gives resistance to a flow of liquid passing through the extension-side passage 52b, and allows only a flow of liquid flowing from the extension-side chamber L1 toward the compression-side chamber L2. The other compression-side valve V2 is a check valve, which allows only a flow of liquid flowing from the compression-side chamber L2 toward the extension-side chamber L1, in the compression-side passage 52c. When the extension-side valve 1 and the compression-side valve V2 are configured to have one or more leaf valves stacked, an axial length of the piston valve 52 can be shortened since each leaf valve is a thin annular plate. However, a valve other than a leaf valve, such as a poppet valve, may be used as the extension-side valve V1 and the compression-side valve V2.

When the extension-side passage 52b provided with the extension-side valve V1, which is the extension-side damping valve, is a main passage, the piston rod 51 is provided with a bypass passage 51a that bypasses the extension-side valve 1 to communicate the extension-side chamber L1 with the compression-side chamber L2. Then, a pilot passage 51b branches off from the middle of this bypass passage 51a, and this pilot passage 51b guides the pressure of the extension-side chamber L1 as a back pressure of the extension-side valve V1. As shown in FIG. 2(b), a throttle O1 is provided on the extension-side chamber L1 side from a branch point p1 of the pilot passage 51b in the bypass passage 51a, while a variable throttle 7 is provided on the compression-side chamber L2 side from the above branch point p1. Therefore, a pressure of the extension-side chamber L1 when liquid passes through the bypass passage 51a is reduced by the throttle O1, and is guided to a rear face of the extension-side valve V1 via the pilot passage 51b to act in the closing direction of this extension-side valve V1. Then, a flow rate of the liquid passing through the extension-side valve V1 and the back pressure of the extension-side valve V1 can be adjusted by the variable throttle 7.

Specifically, the variable throttle 7 is a solenoid valve for extension-side damping force adjustment, and is configured to have a valve element 70 such as a needle valve to form a throttle in the middle of the bypass passage 51a, and a solenoid 71 to drive this valve element 70, as shown in FIG. 2(a). Further, the variable throttle 7 is attached inside the piston rod 51, and its lead wire 72 passes through the inside of the hollow piston rod 51 to extend outwardly of the fork leg 2. The vehicle body 1 is provided with an electronic control device (not shown) called an electronic control unit (ECU). When a driver (not shown) receives a control command from this control device to energize the solenoid 71 of the variable throttle 7, the valve element 70 moves in response to a thrust of this solenoid 71 to change an opening amount of the bypass passage 51a.

Further, inside the hollow piston rod 51, a detection unit 80 constituting a stroke sensor 8 is provided. More specifically, the stroke sensor 8 is configured to have a detected element 81 attached to the rod guide 53, and the detection unit 80 that detects a position of this detected element 81. Further, the above stroke sensor 8 is a magnetostrictive type, the detection unit 80 is a tubular stem configured to have a magnetostrictive line, and the detected element 81 is an annular magnet and is provided on an outer periphery of the detection unit 80. Then, when a current pulse is applied to the magnetostrictive line of the detection unit 80, a position of a portion opposed to the detected element 81 can be measured in the detection unit 80.

Further, the detection unit 80 moves in the axial direction with respect to the cylinder 50 together with the piston rod 51 and the piston valve 52, whereas the detected element 81 does not move with respect to the cylinder 50. Therefore, when the piston rod 51 enters and leaves the cylinder 50, the detected element 81 moves with respect to the detection unit 80. Since a relative movement amount between this detection unit 80 and the detected element 81 is equal to a relative movement amount between the piston valve 52 and the cylinder 50, a displacement of the piston valve 52 can be detected by using the above stroke sensor 8. In addition, since the one fork leg 2 and the other fork leg 3 are connected by the vehicle body side bracket 11 and simultaneously expand and contract, a stroke as the entire front fork F can be obtained by detecting the displacement of the piston valve 52.

Next, the base valve 55 has: a valve disc 55*a* that partitions the compression-side chamber L2 and the liquid storage chamber L3; a suction passage 55*b* and a discharge passage 55*c* that are formed in this valve disc 55*a* to communicate the compression-side chamber L2 with the liquid storage chamber L3; a suction valve V3 provided in the suction passage 55*b* to open and close this suction passage 55*b*; and a discharge valve V4 provided in the discharge passage 55*c* to open and close this discharge passage 55*c*. The suction valve V3 is a check valve, and allows only a flow of liquid flowing from the liquid storage chamber L3 toward the compression-side chamber L2, in the suction passage 55*b*. The other discharge valve V4 is a compression-side damping valve, which gives resistance to a flow of liquid passing through the discharge passage 55*c*, and allows only a flow of liquid flowing from the compression-side chamber L2 toward the liquid storage chamber L3. When the suction valve V3 and the discharge valve V4 are configured to have one or more leaf valves stacked, an axial length of the base valve 55 can be shortened since each leaf valve is a thin annular plate. However, a valve other than a leaf valve, such as a poppet valve, may be used as the suction valve V3 and the discharge valve V4.

Next, the damper 6 of the other fork leg 3 shown in FIG. 3(*a*) is an inverted type, and has: the cylinder 60 connected to the outer tube 40 on the vehicle body side via the cap 44; a piston rod 61 having a terminal end connected to the inner tube 41 on the axle side via the axle side bracket 12, and a distal end movably inserted into the cylinder 60; a piston valve 62 attached to a distal end part of this piston rod 61 and slidably inserted into the cylinder 60; an annular rod guide 63 fixed to an opening on one side of the cylinder 60 and axially supporting the piston rod 61 slidably; a base rod 64 having a terminal end connected to the outer tube 40 via the cap 44, and a distal end side inserted into an opposite side to the piston rod in the cylinder 60; a base valve 65 attached to a distal end part of this base rod 64 and fixed at a predetermined position inside the cylinder 60; an annular free piston 66 slidably inserted between the base rod 64 and the cylinder 60; and a spring 67 to urge the free piston 66 downward in FIG. 3(*a*).

Further, the suspension spring S of the other fork leg 3 is also a coil spring, and is interposed between the rod guide 63 and the axle side bracket 12. That is, one end of the suspension spring S is supported by the outer tube 40 via the rod guide 63, the cylinder 60, and the cap 44, while the other end of the suspension spring S is supported by the inner tube 41 via the axle side bracket 12. Meanwhile, the suspension spring S may be a spring other than a coil spring, such as an air spring, for example. When the suspension spring S is an air spring, the weight of the front fork F can be reduced.

Further, in the cylinder 60, there are formed the extension-side chamber L1 and the compression-side chamber L2 that are vertically partitioned by the piston valve 62 in FIG. 3(*a*), and there is formed a liquid chamber L4 partitioned from the compression-side chamber L2 by the base valve 65. Then, the extension-side chamber L1, the compression-side chamber L2, and the liquid chamber L4 are filled with liquid such as hydraulic oil. In addition, the reservoir R is formed between an outside of the cylinder 60 and the tube member 4. This reservoir R is configured to have a liquid storage chamber L3 that stores liquid, and an air chamber G formed above a liquid surface of the liquid storage chamber L3 to be sealed with gas. A hole 60*a* is formed in an upper part in the cylinder 60 in FIG. 3(*a*), and gas can freely pass the inside and the outside of the cylinder 60 through this hole 60*a*. Then, a space K2 formed above the free piston 66 in the cylinder 60 in FIG. 3(*a*) communicates with the outside of the cylinder 60 via the hole 60*a*, and the air chamber G extends to this space K2.

The spring 67 to urge the free piston 66 is provided in the above space K2. An urging force of the spring 67 acts in a direction to compress the liquid in the cylinder 60 via the free piston 66, and this spring 67 can improve responsiveness of damping force generation of the damper 6. Further, preferably, a groove (not shown) is formed at a predetermined position on an inner periphery of the cylinder 60 or an outer periphery of the base rod 64, and a gap is preferably formed in an inner periphery or an outer periphery of the free piston 66 when the free piston 66 moves backward by a certain amount to reach the above groove. This causes the liquid in the cylinder 60 to flow out into the space K2 through the above gap, and to be discharged from this space K2 through the hole 60*a* to outside the cylinder 60. In the present embodiment, the above spring 67 is a coil spring, but may be a spring other than a coil spring, such as an air spring, for example.

Next, the piston valve 62 has: a valve disc 62*a* that partitions the extension-side chamber L1 and the compression-side chamber L2; an extension-side passage 62*b* and a compression-side passage 62*c* that are formed in this valve disc 62*a* to communicate the extension-side chamber L1 with the compression-side chamber L2; an extension-side valve V5 provided in the extension-side passage 62*b* to open and close this extension-side passage 62*b*; and a compression-side valve V6 provided in the compression-side passage 62*c* to open and close this compression-side passage 62*c*. The extension-side valve V5 is an extension-side damping valve, which gives resistance to a flow of liquid passing through the extension-side passage 62*b*, and allows only a flow of liquid flowing from the extension-side chamber L1 toward the compression-side chamber L2. The other compression-side valve V6 is a check valve, which allows only a flow of liquid flowing from the compression-side chamber L2 toward the extension-side chamber L1 in the compression-side passage 62*c*. When the extension-side valve V5 and the compression-side valve V6 are configured to have one or more leaf valves stacked, an axial length of the piston valve 62 can be shortened since each leaf valve is a thin annular plate. However, a valve other than a leaf valve, such as a poppet valve, may be used as the extension-side valve V5 and the compression-side valve V6.

Further, the base valve 65 has: a valve disc 65*a* that partitions the compression-side chamber L2 and the liquid chamber L4; a suction passage 65*b* and a discharge passage 65*c* that are formed in this valve disc 65*a* to communicate the compression-side chamber L2 with the liquid chamber L4; a suction valve V7 provided in the suction passage 65*b* to open and close this suction passage 65*b*; and a discharge valve V8 provided in the discharge passage 65*c* to open and close this discharge passage 65*c*. The suction valve V7 is a check valve, and allows only a flow of liquid flowing from the liquid chamber L4 toward the compression-side chamber L2, in the suction passage 65*b*. The other discharge valve V8 is a compression-side damping valve, which gives resistance to a flow of liquid passing through the discharge passage 65c, and allows only a flow of liquid flowing from the compression-side chamber L2 toward the liquid chamber L4. When the suction valve V7 and the discharge valve V8 are configured to have one or more leaf valves stacked, an axial length of the base valve 65 can be shortened since each leaf valve is a thin annular plate. However, a valve other than a leaf valve, such as a poppet valve, may be used as the suction valve V7 and the discharge valve V8.

When the discharge passage 65c provided with the discharge valve V8, which is a compression-side damping valve, is a main passage, the base rod 64 is provided with a bypass passage 64a that bypasses the discharge valve 8 to communicate the compression-side chamber L2 with the liquid chamber L4. Then, a pilot passage 64b branches off from the middle of this bypass passage 64a, and this pilot passage 64b guides the pressure of the compression-side chamber L2 as a back pressure of the discharge valve V8. As shown in FIG. 8(b), a throttle O2 is provided on the compression-side chamber L2 side from a branch point p2 of the pilot passage 64b in the bypass passage 64a, while a variable throttle 9 is provided on the liquid chamber L4 side from the above branch point p2. Therefore, a pressure of the compression-side chamber L2 when liquid passes through the bypass passage 64a is reduced by the throttle O2, and is guided to a rear face of the discharge valve V8 via the pilot passage 64b to act in the closing direction of this discharge valve V8. Then, a flow rate of the liquid passing through the discharge valve V8 and the back pressure of the discharge valve V8 can be adjusted by the variable throttle 9.

Specifically, the variable throttle 9 is a solenoid valve for compression-side damping force adjustment, and is configured to have a valve element 90 such as a needle valve to form a throttle in the middle of the bypass passage 64a, and a solenoid 91 to drive this valve element 90, as shown in FIG. 3(a). Further, the variable throttle 9 is attached inside the base rod 64, and its lead wire 92 passes through the inside of the hollowed base rod 64 to extend outwardly of the fork leg 3. As described above, the vehicle body 1 is provided with an electronic control device (not shown). Then, when a driver (not shown) receives a control command from this control device to energize the solenoid 91 of the variable throttle 9, the valve element 90 moves in response to a thrust of this solenoid 91 to change an opening amount of the bypass passage 64a.

Hereinafter, an operation of the front fork F according to the present embodiment will be described.

In an extending operation of the front fork F, in the one fork leg 2, the piston rod 51 retracts from the cylinder 50, and the piston valve 52 moves upward in the cylinder 50 in FIG. 2(a) to compress the extension-side chamber L1. Then, the liquid in the extension-side chamber L1 pushes and opens the extension-side valve V1, moves through the extension-side passage 52b to the compression-side chamber L2. If the variable throttle 7 is open, the liquid in the extension-side chamber L1 moves also through the bypass passage 51a to the compression-side chamber L2. Further, the inside of the cylinder 50 is deficient in the liquid by a volume corresponding to the retraction of the piston rod, so that the liquid corresponding to this deficiency is supplied from the reservoir R to the compression-side chamber L2 through the suction passage 55b.

Further, in the extending operation of the front fork F, in the other fork leg 3, the piston rod 61 retracts from the cylinder 60, and the piston valve 62 moves downward in the cylinder 60 in FIG. 3(a) to compress the extension-side chamber L1. Then, the liquid in the extension-side chamber L1 pushes and opens the extension-side valve V5, and moves through the extension-side passage 62b to the compression-side chamber L2. Further, the inside of the cylinder 60 is deficient in the liquid by a volume corresponding to the retraction of the piston rod, so that the liquid corresponding to this deficiency is supplied from the liquid chamber L4 to the compression-side chamber L2 through the suction passage 65b, and the free piston 66 moves (advances) downward in FIG. 3(a).

Then, in the above front fork F, since the extension-side valves V1 and V5 and the variable throttle 7 apply resistance to a flow of liquid flowing from the extension-side chamber L1 to the compression-side chamber L2, the pressure in the extension-side chamber L1 rises, and a damping force for suppressing the extending operation of the front fork F is exerted. Further, the damping force during the extending operation of the front fork F, that is, an extension-side damping force is adjusted by the variable throttle 7.

More specifically, while a piston speed (speed of the piston valves 52 and 62 moving in the cylinders 50 and 60) is in a low speed region until the extension-side valves V1 and V5 are opened, the liquid in the extension-side chamber L1 moves through the bypass passage 51a to the compression-side chamber L2 the one fork leg 2, and the liquid in the extension-side chamber L1 moves to the compression-side chamber L2 through a well-known orifice provided in the extension-side valve V5, the valve disc 62a, or the like, in the other fork leg 3. Then, driving the valve element 70 of the variable throttle 7 with the solenoid 71 to reduce a passage area of the bypass passage 51a increases the resistance when the liquid passes through the bypass passage 51a, and raises the pressure in the pilot passage 51h to increase the back pressure of the extension-side valve V1. Therefore, operating the variable throttle 7 to reduce the passage area of the bypass passage 51a increases an extension-side damping force of the damper 5 with respect to the piston speed in the low speed region, and raises a valve opening pressure of the extension-side valve V1.

Conversely, driving the valve element 70 of the variable throttle 7 with the solenoid 71 to increase the passage area of the bypass passage 51a reduces the resistance when the liquid passes through the bypass passage 51a, and lowers the pressure in the pilot passage 51b to reduce the back pressure of the extension-side valve V1. Therefore, operating the variable throttle 7 to reduce the passage area of the bypass passage 51a reduces the extension-side damping force of the damper 5 with respect to the piston speed in the low speed region, and lowers the valve opening pressure of the extension-side valve V1.

As described above, since the one fork leg 2 and the other fork leg 3 simultaneously expand and contract, adjusting the extension-side damping force of the damper 5 provided in the one fork leg 2 allows adjustment of the extension-side damping force as the entire front fork F.

Subsequently, in a contracting operation of the front fork F, in the one fork leg 2, the piston rod 51 enters the cylinder 50, and the piston valve 52 moves downward in the cylinder 50 in FIG. 2(a) to compress the compression-side chamber L2. Then, the liquid in the compression-side chamber L2 opens the compression-side valve V2, and moves through the compression-side passage 52c to the extension-side chamber L1. Furthermore, the inside of the cylinder 50 has excess of liquid of a volume corresponding to entering of the piston rod, so that this excess liquid pushes and opens the discharge valve V4, and passes through the discharge passage 55c to be discharged from the compression-side chamber L2 to the reservoir R.

Further, in the contracting operation of the front fork F, in the other fork leg 3, the piston rod 61 enters the cylinder 60, and the piston valve 62 moves upward in the cylinder 60 in FIG. 3(*a*) to compress the compression-side chamber L2. Then, the liquid in the compression-side chamber L2 opens the compression-side valve V6, and moves through the compression-side passage 62*c* to the extension-side chamber L1. Furthermore, the inside of the cylinder 60 has excess of liquid of a volume corresponding to entering of the piston rod, so that this excess liquid pushes and opens the discharge valve V8, and moves through the discharge passage 65*c* from the compression-side chamber L2 to the liquid chamber L4. If the variable throttle 9 is open, the liquid in the compression-side chamber L2 passes also through the bypass passage 64*a* to be discharged from the compression-side chamber L2 to the liquid chamber L4, and the free piston 66 moves (retracts) upward in FIG. 3(*a*).

Then, in the above front fork F, since the discharge valves V4 and V8 and the variable throttle 9 apply resistance to a flow of liquid flowing from the compression-side chamber L2 to the reservoir R and the liquid chamber L4, the pressure in the cylinder 60 rises, and a damping force for suppressing the contracting operation of the front fork F is exerted. Further, the damping force during the contracting operation of the front fork F, that is, a compression-side damping force is adjusted by the variable throttle 9.

More specifically, while the piston speed is in the low speed range until the discharge valves V4 and V8 are opened, the liquid in the compression-side chamber L2 moves through the bypass passage 64*a* to the liquid chamber L4 in the other fork leg 3, and the liquid in the compression-side chamber L2 moves to the reservoir R through a well-known orifice provided in the discharge valve V4, the valve disc 55*a*, or the like, in the one fork leg 2. Then, driving the valve element 90 of the variable throttle 9 with the solenoid 91 to reduce a passage area of the bypass passage 64*a* increases the resistance when the liquid passes through the bypass passage 64*a*, and raises the pressure in the pilot passage 64*b* to increase the back pressure of the discharge valve V8. Therefore, operating the variable throttle 9 to reduce the passage area of the bypass passage 64*a* increases a compression-side damping force of the damper 6 with respect to the piston speed in the low speed region, and raises a valve opening pressure of the discharge valve V8.

Conversely, driving the valve element 90 of the variable throttle 9 with the solenoid 91 to increase the passage area of the bypass passage 64*a* reduces the resistance when the liquid passes through the bypass passage 64*a*, and lowers the pressure in the pilot passage 64*b* to reduce the back pressure of the discharge valve V8. Therefore, operating the variable throttle 9 to increase the passage area of the bypass passage 64*a* reduces the compression-side damping force of the damper 6 with respect, to the piston speed in the low speed region, and lowers the valve opening pressure of the discharge valve V8.

As described above, since the one fork leg 2 and the other fork leg 3 simultaneously expand and contract, adjusting the compression-side damping force of the damper 6 provided in the other fork leg 3 allows adjustment of the compression-side damping force as the entire front fork F.

Hereinafter, working effect of the front fork F according to the present embodiment will be described.

In the above front fork F, the other fork leg 3 has: the compression-side chamber (room) L2 and the liquid chamber (room) L4 that are formed in the cylinder 60 and partitioned by the base valve 65; the discharge passage (main passage) 65*c* communicating these chambers; the discharge valve (compression-side damping valve) V8 to open and close this discharge passage 65*c*; the bypass passage (bypass passage for compression-side damping valve bypass) 64*a* that bypasses this discharge valve to communicate the compression-side chamber L2 with the liquid chamber L4; and the pilot passage 64*b* that branches off from this bypass passage 64*a* to guide the pressure of the compression-side chamber (room on an upstream side of the compression-side damping valve) L2 as the back pressure of the discharge valve V8. Then, the variable throttle (solenoid valve for compression-side damping force adjustment) 9 makes the opening amount variable on a downstream side of the branch point p2 of the pilot passage 64*b* in the bypass passage 64*a*.

According to the above configuration, a valve opening pressure of the discharge valve V8, which is the compression-side damping valve, can be made variable, and the damping force in the low speed region until this discharge valve V8 is opened can be made variable. Therefore, an adjustment region of the compression-side damping force of the front fork F can be increased. Meanwhile, the discharge valve V8 itself may be the solenoid valve for compression-side damping force adjustment, and in this case, a solenoid valve other than the variable throttle may be adopted as the discharge valve V8. Further, the pilot passage 64*b* may be omitted, and the compression-side damping force may be adjusted only by adjusting the opening amount of the bypass passage 64*a* with the variable throttle 9. In such a way, an adjusting method of a compression-side damping force using the solenoid valve can be appropriately changed according to a desired compression-side damping force.

In addition, in the above front fork F, the one fork leg 2 has: the extension-side chamber (room) L1 and the compression-side chamber (room) L2 that are formed in the cylinder 50 and partitioned by the piston valve 52; the extension-side passage (main passage) 52*b* communicating these chambers; the extension-side valve (extension-side damping valve) V1 to open and close this extension-side passage 52*b*; the bypass passage (bypass passage for extension-side damping valve bypass) 51*a* that bypasses this extension-side valve V1 to communicate the extension-side chamber L1 with the compression-side chamber L2; and the pilot passage 51*b* that branches off from this bypass passage 51*a* to guide the pressure of the extension-side chamber (room on an upstream side of the extension-side damping valve) L1 as the back pressure of the extension-side valve V1. Then, the variable throttle (solenoid valve for extension-side damping force adjustment) 7 makes the opening amount variable on a downstream side of the branch point p1 of the pilot passage 51*b* in the bypass passage 51*a*.

According to the above configuration, a valve opening pressure of the extension-side valve V1, which is the extension-side damping valve, can be made variable, and the damping force in the low speed region until this extension-side valve V1 is opened can be made variable. Therefore, an adjustment region of the extension-side damping force of the front fork F can be increased. Meanwhile, the extension-side valve V1 itself may be the solenoid valve for extension-side damping force adjustment, and in this case, a solenoid valve other than the variable throttle may be adopted as the extension-side valve V1. Further, the pilot passage 51*b* may be omitted, and the extension-side damping force may be adjusted only by adjusting the opening amount of the bypass passage 51*a* with the variable throttle 7. In such a way, an adjusting method of an extension-side damping force using the solenoid valve can be appropriately changed according to a desired extension-side damping force. Moreover, this adjusting method of an extension-side damping force can be changed irrespective of the adjusting method of a compression-side damping force.

In addition, in the above front fork F, the damper 6 of the other fork leg 3 has: the cylinder 60 connected to the outer tube (vehicle body side tube) 40; the piston rod. 61 connected to the inner tube (axle side tube) 41; the piston valve 62 attached to the distal end part of this piston rod 61 and movably inserted into the cylinder 60; the base rod 64 connected to the outer tube 40 and having its distal end side inserted into the opposite side to the piston rod in the cylinder; and the base valve 65 attached to the distal end part of this base rod 64. Then, the variable throttle (solenoid valve for compression-side damping force adjustment) 9 is provided in the base rod 64.

According to the above configuration, the damper 6 is an inverted type, and the base valve 65 for compression-side damping force generation is provided on the vehicle body side. Therefore, when the variable throttle 9 for compression-side damping force adjustment is provided in the base rod 64 holding this base valve 65, the variable throttle 9 can be provided without complicating a circuit for compression-side damping force adjustment. Further, the variable throttle 9 is attached to the outer tube 40 on the vehicle body side via the base rod 64, and the lead wire 92 to energize the solenoid 91 can be extended outward of the fork leg 3 through inside the base rod 64, preventing complicated wiring. Therefore, according to the above configuration, it is easy to provide the variable throttle 9 for compression-side damping force adjustment in the sprung portion. Note that the configuration of the damper 6 is not limited to the above, but can be appropriately chanced, for example, to be an upright type. Then, such change can be made irrespective of the adjusting methods of an extension-side damping force and a compression-side damping force.

In addition, the above front fork F includes: the tube member 4 having the outer tube (vehicle body side tube) 40 and the inner tube (axle side tube) 41; the pair of fork legs 2 and 3 having the dampers 5 and 6 disposed in this tube member 4 and interposed between the outer tube 40 and the inner tube 41; the variable throttle (solenoid valve for extension-side damping force adjustment) 7 to adjust an extension-side damping force; the variable throttle (solenoid valve for compression-side damping force adjustment) 9 to adjust a compression-side damping force; and the stroke sensor 8. Then, the damper 5 of the one fork leg 2 has: the cylinder 50 connected to the inner tube (axle side tube) 41; the piston rod 51 connected to the outer tube (vehicle body side tube) 40; and the piston valve 52 attached to this piston rod 51 and movably inserted into the cylinder 50. In addition, the variable throttle (solenoid valve for extension-side damping force adjustment) 7 is provided in the piston rod 51 or the one fork leg 2. Further, the variable throttle (solenoid valve for compression-side damping force adjustment) 9 is attached to the outer tube (vehicle body side tube) 40 of the other fork leg 3. Furthermore, the stroke sensor 8 is attached to the one fork leg 2, and has the detected element 81 attached to the cylinder 50, and the detection unit 80 that is attached to the piston rod 51 and detects a displacement of the detected element 81.

According to the above configuration, the damper 5 is an upright type, and the piston valve 52 for extension-side damping force generation is provided on the vehicle body side. Therefore, when the variable throttle 7 for extension-side damping force adjustment is provided in the piston rod 51 holding this piston valve 52, the variable throttle 7 can be provided without complicating a circuit for adjustment of an extension-side damping force. Further, the variable throttle 7 is attached to the outer tube 40 on the vehicle body side via the piston rod 51, and the lead wire 72 to energize the solenoid 71 can be extended outward of the fork leg 2 through inside the piston rod 51, preventing complicated wiring. Therefore, according to the above configuration, it is easy to provide the variable throttle 7 for extension-side damping force adjustment in the sprung portion.

Furthermore, according to the above configuration, since the stroke sensor 8 is attached to the one fork leg 2 having the upright damper 5, the detection unit 80 having a magnetostrictive line can be inserted into the piston rod 51 when the stroke sensor 8 is for detecting a magnetostrictive linear displacement, for example. That is, since the detection unit 80 to extract a position of the detected element 81 as a signal is attached to the outer tube 40 on the vehicle body side via the piston rod 51, it is easy to arrange the detection unit 80 in the sprung portion. Further, with the above stroke sensor 8, since a displacement amount of the detected element 81 with respect to the detection unit 80 is equal to a stroke amount of the front fork F, this stroke amount can be obtained more accurately.

In addition, according to the above configuration, since the variable throttle 9 for compression-side damping force adjustment is provided in the other fork leg 3, the variable throttle 7 for extension-side damping force adjustment and the stroke sensor 8 do not interfere with attachment of the variable throttle 9 to the outer tube 40 on the vehicle body side. Therefore, it is easy to arrange the variable throttle 9 for compression-side damping force adjustment in the sprung portion.

That is, according to the above configuration, the variable throttles 7 and 9, which are solenoid valves to make the damping force variable, and the stroke sensor 8 can all be arranged in the sprung portion. The sprung portion is a portion supported by the suspension spring S. Vibration in the sprung portion is gentle as compared with an unsprung portion, providing a good vibration environment for electronic equipment. Therefore, when all the variable throttles 7 and 9 and the stroke sensor 8 are arranged in such a sprung portion, the stroke of the front fork F can be accurately measured, and the variable throttles 7 and 9 can be accurately driven, enhancing adjustment accuracy of the damping force to obtain a desired damping force.

Note that the tube member 4 is an inverted type and the outer tube 40 is a vehicle body side tube in the present embodiment, but the tube member 4 may be an upright type. In this case, the inner tube becomes the vehicle body side tube, and the outer tube becomes the axle side tube.

In addition, although the magnetostrictive stroke sensor 8 is used in the present embodiment, the type of the stroke sensor 8 is not limited to the magnetostrictive type, but can be appropriately changed as long as the stroke of the front fork F can be measured.

In the present embodiment, the extension-side valves V1 and V5 of both of the dampers 5 and 6 are extension-side damping valves, and the discharge valves V4 and V8 are compression-side damping valves. However, the extension-side valve V5 and the discharge valve V4 may be check valves, only the one damper 5 may exert the extension-side damping force, and only the other damper 6 may exert the compression-side damping force.

In the present embodiment, the compression-side valves V2 and V6 of both of the dampers 5 and 6 are check valves. However, these may be the compression-side damping valves to give resistance to a flow of liquid passing through the compression-side passages 52c and 62c.

Furthermore, in the present embodiment, the front fork F is mounted on a motorcycle, but it is needless to say that the front fork F may be mounted on a straddle type vehicle other than the motorcycle.

Then, these changes can be made irrespective of the adjusting methods of an extension-side damping force and a compression-side damping force, and the configuration of the damper 6 of the other fork leg 3.

While the preferred embodiments of the present invention have been described in detail, modifications, variations, and alterations can be made without departing from the scope of the claims.

The invention claimed is:

1. A front fork comprising:
a pair of fork legs each having a tube member and a damper, the tube member having a vehicle body side tube and an axle side tube, and the damper being disposed in the tube member and interposed between the vehicle body side tube and the axle side tube;
a solenoid valve for extension-side damping force adjustment to adjust an extension-side damping force;
a solenoid valve for compression-side damping force adjustment to adjust a compression-side damping force; and
a stroke sensor, wherein
the damper of one fork leg of the pair of fork legs has a cylinder connected to the axle side tube, a piston rod connected to the vehicle body side tube, and a piston valve attached to the piston rod and movably inserted into the cylinder,
the solenoid valve for extension-side damping force adjustment is provided in the piston rod of the one fork leg,
the solenoid valve for compression-side damping force adjustment is attached to the vehicle body side tube of another fork leg of the pair of fork legs, and
the stroke sensor is attached to the one fork leg, and has a detected element attached to the cylinder, and a detection unit that is attached to the piston rod and detects a displacement of the detected element.

2. The front fork according to claim 1, wherein
the damper of the other fork leg has a cylinder connected to the vehicle body side tube, a piston rod connected to the axle side tube, a piston valve attached to a distal end part of the piston rod and movably inserted into the cylinder, a base rod connected to the vehicle body side tube and having a distal end side inserted into an opposite side to the piston rod in the cylinder, and a base valve attached to a distal end part of the base rod, and
the solenoid valve for compression-side damping force adjustment is provided in the base rod.

3. The front fork according to claim 2, wherein
the other fork leg has:
two rooms formed in the cylinder and partitioned by the base valve;
a main passage communicating the two rooms;
a compression-side damping valve to open and close the main passage;
a bypass passage for compression-side damping valve bypass that bypasses the compression-side damping valve to communicate the two rooms; and
a pilot passage that branches off from the bypass passage for compression-side damping valve bypass to guide a pressure of one of the two rooms on an upstream side of the compression-side damping valve as a back pressure of the compression-side damping valve, and
the solenoid valve for compression-side damping force adjustment makes an opening amount variable on a downstream side of a branch point of the pilot passage in the bypass passage for compression-side damping valve bypass.

4. The front fork according to claim 1, wherein
the one fork leg has:
two rooms formed in the cylinder and partitioned by the piston valve;
a main passage communicating the two rooms;
an extension-side damping valve to open and close the main passage;
a bypass passage for extension-side damping valve bypass that bypasses the extension-side damping valve to communicate the two rooms; and
a pilot passage that branches off from the bypass passage for extension-side damping valve bypass to guide a pressure of one of the two rooms on an upstream side of the extension-side damping valve as a back pressure of the extension-side damping valve, and
the solenoid valve for extension-side damping force adjustment makes an opening amount variable on a downstream side of a branch point of the pilot passage in the bypass passage for extension-side damping valve bypass.

* * * * *